March 27, 1956  J. L. BILLS  2,739,994
ACETYLENE PROCESS
Filed April 21, 1952
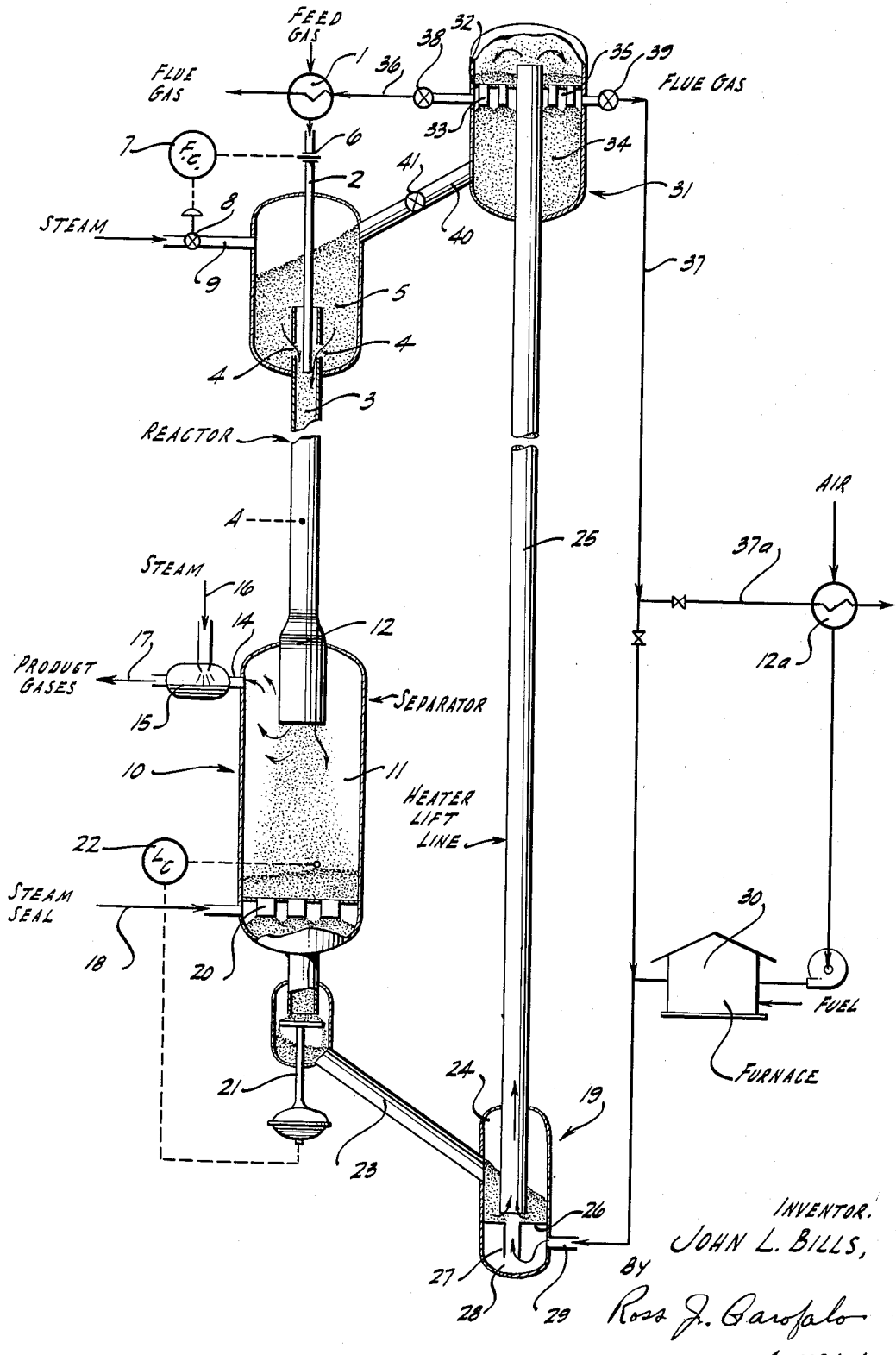
INVENTOR.
JOHN L. BILLS,
BY
Ross J. Garofalo
ATTORNEY.

United States Patent Office 2,739,994
Patented Mar. 27, 1956

2,739,994

ACETYLENE PROCESS

John L. Bills, Long Beach, Calif., assignor to Union Oil Company of California, Los Angeles, Calif., a corporation of California Application April 21, 1952, Serial No. 283,269

10 Claims. (Cl. 260—679)

This invention relates to methods and means for the production of acetylene and other unsaturated hydrocarbons by the thermal cracking of hydrocarbon gases. More specifically it is concerned with cracking methods employing a solid, particle-form heat-transfer medium to supply the thermal requirements of the reaction. The essential features of novelty reside in contacting the solids and gases in such manner as to minimize gas/solids velocity differentials, and also in maintaining optimum temperatures, pressures and reaction times, whereby maximum yields are obtained, and coking is minimized.

The thermal cracking of hydrocarbon gases at high temperatures to form acetylene and other unsaturated hydrocarbons has been heretofore proposed, as for example, by passing the feed gases through a heated tube. However, such processes, as previously practiced, are found to result in excessive coke formation on the walls of the reactor which obstructs gas flow and inhibits effective heat transfer through the reactor walls. Considerable difficulty is therefore usually encountered in controlling reaction gas temperatures, flow rates and reaction time. In order to overcome some of these difficulties it has recently been proposed to employ granular heat-transfer contact materials to supply the required heat of reaction. These granular materials are heated to somewhat above the required reaction temperature, and the feed gases, usually preheated to within a few hundred degrees of the required reaction temperature, are then contacted directly with the heated solids for a controlled period of time, and are then removed and quenched to below the decomposition temperature of acetylene. By this procedure, good control of heat transfer, and gas temperature is generally obtainable. Any coke formed is continuously removed on the contact material. However, even though these factors are adequately controlled, it is found that low yields of acetylene are still characteristic, and severely limit the commercial application of such granular contact processes. Moreover, even though the coke formed is continuously removed from the reaction zone on the contact material, it is necessary to periodically or continuously remove the coke from the contact material, usually by combustion, in order to prevent excessive build-up in the size of such particles.

Most of the previously proposed methods employing granular heat-transfer solids are of the countercurrent flow type, or embody essentially stationary beds of contact material, as for example fluidized beds. In such processes, the maximum permissible gas velocity is limited by the "lifting" velocity of the solids. This severely limits the volume capacity of the apparatus employed. Since the gas velocity is thus limited, and the contact time must be of a very low order, these processes to be effective at all, must also be limited to the use of relatively shallow beds of contact material. This limitation leads to other difficulties such as channeling of gases in the contact bed, and uneven contact times and gas temperatures through different parts of the bed. The present process avoids these difficulties by providing for concurrent flow of gases and solids.

It is therefore a broad object of this invention to provide economically feasible methods for the manufacture of acetylene by thermal cracking of hydrocarbon gases.

A further object is to provide suitable modifications in the processes employing particle-form solid heat transfer contact materials whereby the acetylene yields are increased, and coking is minimized.

A specific object of the invention is to provide an optimum relation between reaction gas velocities and solid contact velocities whereby the laydown of coke on the contact material is minimized and maximum yields are obtained.

A further object is to avoid the limitations as to gas flow velocity inherent in previous countercurrent gas-solids flow processes or fluidized bed processes, wherein the maximum gas velocity is limited by the "lifting" velocity of the solids.

A further specific object is to reduce the expense involved in excessive decoking operations on the contact material.

Still another object is to provide adequate means for controlling and limiting the reaction period of gaseous reactants at high temperatures.

Other objects of the invention will be apparent to those skilled in the art from the more detailed description which follows.

The feed materials employed herein consist predominantly of the lower hydrocarbon gases such as methane, ethane, propane, butane, ethylene, propylene, and mixtures thereof such as natural gas. Higher hydrocarbons may also be employed. The temperatures employed may range between about 1800° F. and 3000° F. However, acetylene is not stable at such temperatures, and overheating results in the decomposition thereof to form coke. It is therefore also necessary to limit the period of time during which the gases are held at high temperatures to a maximum of about 0.5 second. Even shorter reaction periods are desirable, and may range downwardly as low as 0.001 second. The preferred reaction period is between about 0.005 and 0.1 second. The formation of acetylene in preference to coke is likewise favored by low pressures, preferably from about ½ to 1 atmosphere. Higher pressures result in greater coke formation. The overall requirements for the desired reaction therefore must embody methods for obtaining high temperatures for a short period of time at low pressures.

The prior art procedures employing heated pebbles or other particles as the heat transfer medium have been found to result in substantially lower yields of acetylene than may be obtained by employing a furnace heated tubular reactor. However, as stated above, such externally heated tubular reactors rapidly become plugged with carbon and require periodic shutdowns for carbon removal. It has now been found, however, that the yields of acetylene obtainable by contact of the above gases with moving beds of heated contact materials may be materially increased if the relative velocity of gas and contact material is reduced to a minimum, preferably zero. The contact methods previously proposed involve substantial differences in relative flow velocities, as for example by maintaining countercurrent flow of gases and solids, or by gas flow through an essentially stationary bed of contact material such as a fluidized bed. The reason for the poor yields obtained by such methods is not known with any great degree of certainty, but several theoretical explanations are possible.

One such explanation may be that gas flow which is obstructed by solid obstacles results in an undesirable eddying, or mixing of gas increments at different stages of reaction. The acetylene precursors first formed in the gas-flow front which are at a high energy level may be diverted from the desired combination with other such particles to form acetylene, and may combine to a larger extent with particles or ions at a lower energy level to form coke for example. Other theories are possible, but in the absence of experimental corroboration, the results obtained herein must be regarded as purely empirical.

The most practical method for reducing the relative velocities of gas and solids is to provide what amounts essentially to concurrent flow of both materials through the reaction zone. This may be accomplished by passing the feed gases horizontally, downwardly, or upwardly through the reaction zone, together with the desired amount of preheated granular solid. The heated solids are preferably introduced into the gas stream at one or more points by aspiration or by suitable metering devices, such as will be described hereinafter. In all cases, however, the solids and gases flow concurrently at approximately the same velocity, and after the desired reaction period, the gas stream is cooled rapidly, as by heat-transfer or steam quenching.

It is ordinarily preferable to separate the reaction gases from the solids before quenching in order to avoid reducing the temperature of the solids, which will thus require less reheating for the next reaction cycle. However, the combined solids-gas suspension may be quenched if desired, especially if the heat removed from the solids can be utilized to advantage for other purposes.

In a preferred modification of the invention, the ratio of solids to feed gas in the reactor is maintained at less than about 10 pounds per s. c. f. in order to reduce the solids handling cost to a minimum. In operating according to this modification it is usually necessary to heat the solids to a higher temperature in order to provide the necessary heat balance, e. g., to between about 2500–3200° F. With the usual feed gases, and with contact materials in the specific heat range of coke or sillimanite, and with initial temperature differentials between feed gas and contact material of about 500–1000° F., the optimum ratio of contact material to feed gas lies in the range from about 0.5 to 5.0 lbs./s. c. f.

It may also be desirable in some cases to introduce a steam diluent with the feed gases in order to obtain the desired partial pressure of hydrocarbons.

The granular contact materials employed herein may consist of any inert heat-resistant material. Examples of such materials include pumice, firebrick, porous ceramic particles, Carborundum, aluminum oxide, calcium oxide, magnesium oxide, spent catalyst granules, petroleum coke, "Alundum," "Koppers" coke, or any other granular material which will withstand temperatures up to 3000° F. Cokes are preferred materials in most cases since they are economical and, in this process, seldom require regeneration, inasmuch as the build-up in particle size due to coke deposition is compensated for by attrition against the walls of the reaction and recirculation vessels. Cokes are likewise preferable from the standpoint of chemical inertness.

The particle size may vary considerably. The practical limits lie between about 10 and 40 mesh. Particles larger than about 10 mesh are found to be highly susceptible to spalling and cracking as a result of differential expansion brought about by alternating temperature fluctuations. On the other hand, particles smaller than about 40 mesh are disadvantageous from the standpoint of ease of separation from the gases. Since it is preferred to separate the solids prior to quenching of the reaction gases, and at the same time it is necessary to limit the reaction time to a very short period, the gases must be rapidly separated from the solids. If particles smaller than about 40 mesh are employed, it is very difficult to separate them before the expiration of the allotted reaction period by any of the conventional methods.

In order to maintain the gases and solids at as nearly the same velocity as possible during the reaction period, it is preferred to employ a reactor wherein the fluid flow is either horizontal or downward, or at some angle between these two extremes. The reason for this preference may be understood by considering the mechanics involved. In employing a downflow reactor, the solids, starting from their initial velocity $V_0$, will rapidly be brought to the gas velocity $V_g$ by frictional gas drag plus the acceleration of gravity. After reaching the gas velocity, the solids will continue to accelerate by gravity until their terminal velocity $V_t$ is reached. This terminal velocity will be equal to the gas velocity, $V_g$ plus the settling velocity $V_s$ of the particular solids in the particular gas. In other words:

$$V_t = V_g + V_s$$

In the case of an upflow reactor, the solids, starting from $V_0$, will reach a terminal velocity which is equal to the gas velocity minus the settling velocity, or:

$$V_t = V_g - V_s$$

At any point between $V_0$ and $V_t$, the velocity of the solids in a downflow reactor will be closer to $V_g$ than in an upflow reactor, due to the opposite effects of gravity in the two cases. In the case of a horizontal reactor, there is no gravity component to be considered and hence, neglecting friction:

$$V_t = V_g$$

In this case also the solids velocity at any point between $V_0$ and $V_t$ will be closer to $V_g$ than in an upflow reactor. In the case of a horizontal reactor, $V_t$ is closer to $V_g$ than in either an upflow or downflow reactor. However, the terminal velocities are not ordinarily reached herein prior to the expiration of the reaction period due to the relationship existing between particle size, particle density, and gas density. It is therefore preferable to employ, as a practical matter, either a downflow or a horizontal reactor, or one inclined to some angle between these extremes in order that the solids velocity will be as close to $V_g$ as possible during the reaction period. In all cases it is preferable to adjust the particle size and/or specific gravity, and/or the gas flow direction so that the relative difference between gas and solids velocity during the reaction period will not be more than about 20 feet per second.

The invention may perhaps be most readily understood by referring to the drawing attached hereto, which is a partly elevational and partly sectional view of a specific type of apparatus for carrying out the invention.

Referring more particularly to the figure, this apparatus represents a suitable downflow type of reactor. The feed gas, which is preferably preheated to between about 700–1400° F. in a heat exchanger 1, enters through a tubular conduit 2, the lower end of which is enclosed in the upper portion of a larger tubular reactor 3. Reactor 3 may be constructed of Carborundum, ceramic, or other heat resistant material, and may vary in inside diameter from about ½ inch to 8 inches, although other dimensions may be employed. The lower end of conduit 2 terminates below or in the vicinity of a plurality of orifices 4, arranged circumferentially in the upper wall of reactor 3. Orifices 4 communicate with the interior of a surrounding hopper 5 which is maintained partially filled with hot contact material, to a level above that of the orifices. This level is maintained by gravity flow of solids from a heating system described hereinafter. The temperature of the solids in hopper 5 may vary between about 2000–3000° F. The diameter of orifices 4 should be at least several times that of the contact particles. An orifice plate 6 in conduit 2 is arranged to actuate a flow control mechanism 7 which in turn operates valve 8 in line 9. Line 9 carries steam, or other inert gas, under moderate pressure, e. g. 1–10 p. s. i. g. into hopper 5. By the operation of control mechanism 7 a variable steam pressure is maintained in hopper 5 which is directly proportional to the flow rate of feed gas. The variable steam pressure in hopper 5 in turn forces a variable quantity of solids through orifices 4 into reactor tube 3 where they fall and mingle with the feed gases. In this manner, the ratio of solids to feed gas may be maintained at any desired constant level, which may vary between about 0.5–5.0 pounds per s. c. f. of feed gas, depending upon the temperature of the solid material and its specific heat, and the initial temperature of the feed gas.

After passing into the reaction tube 3, the feed gas is rapidly brought to a reaction temperature of between about 1800–3000° F. by heat transfer from the suspended solids. This gas temperature should be maintained for not more than about 0.5 second, and preferably less than about 0.01 second, and should then be rapidly quenched to less than about 1400° F. In the modification herein illustrated, the solids are separated from the gases prior to quenching in order to avoid lowering the solids temperature. Gas-solids separation is accomplished in separator 10 which consists of a chamber 11 and a concentrically enclosed, enlarged expansion tube 12, open at its lower end. The gases and solids pass downwardly from reactor 3 into and through expansion tube 12 into chamber 11. The gases are decelerated in chamber 11 to the point where the solids settle by gravity to the bottom thereof. Product gases pass out through line 14 into a quenching chamber 15. Steam, water or other inert cooling medium is injected into quenching chamber 15 through line 16, and the reaction gases are thereby rapidly quenched to below about 1400° F. The cooled gases then pass out through line 17 to gas separation apparatus not shown.

In order to maintain the desired extremely short reaction period of between about 0.5 and 0.005 second, any one or more process or apparatus variables may be adjusted. The mean path of the reaction gases between a point A in reaction tube 3 at which the desired reaction temperature is reached, and the quenching chamber 15 may be shortened or lengthened, or the gas velocity may be increased or decreased. For example, if a slow gas velocity of say less than 50 feet per second is maintained, the gas path distance between point A and the quenching chamber 15 may be shortened to about 0.25 to 5 feet. If high gas velocities are maintained, as for example between 50–500 ft./sec., the length of the hot gas path may be increased to about 2 to 100 feet. Conversely, with a constant gas path length, the gas velocity may be varied to obtain the desired reaction period by varying the rate of feed.

The separator 10 may be replaced by any other known type of gas-solids separator, as for example, a conventional cyclone type. In employing a cyclone separator the quench gas such as steam may be introduced directly into the vortex of the outgoing gases.

The solids which settle in chamber 11 are ordinarily somewhat below the reaction temperature, for example, about 1400–1700° F. and are then transferred to an induction zone 19. The transfer is accomplished in known manner by means of gravity flow through downcomers 20, valve 21 operated by a solids level control device 22, and conduit 23. A seal may be provided by introducing steam into the bottom of chamber 11 through line 18 in order to prevent leakage of product gases into induction zone 19.

Induction zone 19 consists of an enclosed chamber 24 housing the lower end of a lift line 25 which extends almost to the top of a solids supporting tray 26 having a central downcomer 27 communicating with a lower gas chamber 28. An inlet line 29 is provided for entry of hot flue gas from furnace 30. Low pressure hot flue gas is admitted to chamber 28 and passes upwardly through downcomer 27 and into lift line 25. Chamber 24, and lift line 25 are preferably constructed of heat resistant ceramics capable of withstanding temperatures up to about 3000° F. The solids in chamber 24 flow by gravity into the path of flue gas entering line 25 and are conveyed upwardly thereby in fluid suspension. The distance between the lower end of lift line 25 and tray 26 is adjusted to provide the desired rate of flow of solids. The temperature of the flue gas is sufficient to reheat the solids to above the desired reaction temperature during the lift period.

At the top of lift line 25 the gas-solids suspension is decelerated in separator 31 to permit separation of gases from solids. Upon deceleration of gases the hot solids settle on supporting tray 32, and flow by gravity through downcomers 33 into solids reservoir 34. Partly cooled flue gas is withdrawn from space 35 through either or both of lines 36 and 37, depending upon the position of valves 38 and 39. By opening valve 38 and closing valve 39, the flue gas may be passed through heat exchanger 1 to preheat the feed gas. By opening valve 39 and closing valve 38 it may be passed through line 37 and into line 29 to dilute the hot flue gases. This latter arrangement is employed in order to obtain any desired ratio between gas velocity and temperature in the lift line. Alternatively, part or all of the spent flue gases may be diverted from line 37 to line 37a and passed through heat exchanger 12a to preheat air for furnace 30.

After passing through downcomers 33 the hot solids accumulate in the bottom portion of chamber 34. From this chamber the solids flow through conduit 40 into hopper 5 by compact gravity flow. A valve 41 interposed in conduit 40 may be employed to regulate the flow of solids and to prevent back flow of steam from chamber 5. The lower opening of conduit 40 is positioned in hopper 5 so that the solids will seek a level above the orifices 4.

In the apparatus illustrated, it should be understood that the portions thereof which should withstand high temperatures, as for example, the reactor tube and the various conduits and chambers for handling the heated solids should be constructed of heat resistant materials such as ceramics, Carborundum or firebrick, or in some cases heat resistant alloys may be employed. Also, it will be understood that all parts of the apparatus illustrated should be adequately insulated against heat loss.

Auxiliary solids injection devices may be employed for introducing additional solids into one or more sections of the reactor tube 3 in order to obtain a desired temperature profile.

After several cycles of operation as described, the particle size of the contact material may become substantially increased as a result of coke laydown. The total volume of solids will also increase. If the contact material is coke, this increase in particle size and total solids volume may be controlled by continuously drawing off a side-stream of solids from chamber 11, dividing the side stream into two portions, A and B, regrinding portion A to the desired particle size and returning it to the solids stream in the reactor and discarding, or otherwise utilizing portion B. By varying the volumes of portions A and B, adequate control of particle size and total solids volume may be maintained. Alternatively, with any type of contact material, these two factors may be controlled by admitting a measured quantity of air into the flue gases employed for reheating the solids. In this manner the excess coke may be removed by combustion with the flue gases.

Many other variations could be made in the type of apparatus employed for carrying out this process, and the process should therefore not be considered as being limited to the particular apparatus disclosed in the drawings.

The following examples are cited as operable procedures which may be employed in practicing this invention, but should not be considered as limiting in scope.

*Example I*

A feed gas consisting essentially of methane is preheated to about 1200° F. and passed at the rate of about 10,600 s. c. f./hr. through a refractory tubular downflow reactor, 4 inches in inside diameter, similar to that shown in the figure. Heated coke particles of about 20 mesh are metered into the incoming gas stream at the rate of about 3.5 pounds per s. c. f. of feed gas. The temperature of the coke is about 3000° F. A fluid suspension is formed which flows downwardly at an initial velocity of about 125 ft./sec. The lower end of the reaction tube terminates in a gas-solids separator 10 as shown in Fig. 1. Gas and solids are separated in separator 10 as previously described, and the hot product gases pass immediately into steam quenching zone 15. The mean gas path between the point at which feed gases and solids are first mixed, and the quench zone 15 is about 5 ft. This distance provides a reaction period at 2000–2500° F. of about 0.01 sec., at this particular gas-flow rate. The gases are quenched with steam in chamber 15 to below about 1200° F. The product gases from this single-pass example are found to contain about 8.3 volume per cent of acetylene.

The solids collecting in the bottom of separator 10 are at about 2200° F., and are then transferred to induction zone 19, as previously described. In order to reheat the solids, hot flue gas from furnace 30 is admitted to chamber 28 under a low pressure of about 1 p. s. i. g. The distance between the lower end of lift line 25 and supporting tray 26 is adjusted to permit the solids to flow into the gas stream at about 37,000 lbs./hr. The ratio of flue gas to solids is about 2 s. c. f. per pound. In traversing the lift line the solids are reheated to 3,000° F.

*Example II*

In order to evaluate the results obtainable by this process, and compare them with those obtainable with stationary contact beds, a series of experiments was carried out as follows:

A. A stream of natural gas at atmospheric pressure, and preheated to 1400° F., was passed through a horizontal tubular reactor packed with 20–40 mesh coke particles in a stationary bed and heated externally by means of an electric furnace to a maximum temperature of about 2800° F. The velocity of gas flow was about 400 feet per second and the contact time between 2000–2600° F. was about 0.01 second. After running the gases for 30 seconds, the reactor became almost completely plugged with carbon so that no further gas could be passed through. The product gases were collected and found to contain 2.2% acetylene by volume.

B. Under exactly similar conditions, but employing an empty tubular reactor, and aspirating the coke particles into the feed gas, whereby the gas-solid suspension was carried concurrently through the heated tube, the product gases were found to contain 4.2% of acetylene by volume.

C. By repeating Example II–B employing 20–45 mesh sillimanite particles instead of coke, an acetylene yield of 5.06% was obtained.

These experiments clearly indicate that the tortuous flow of feed gases in and around a stationary particle-form contact mass is disadvantageous from the standpoint of acetylene yield and coke production. The evidence indicates that such a procedure favors the breakdown of acetylene to coke. By contrast, flowing the gases concurrently with the solids in such manner as to minimize the relative gas-solids velocity, and thereby reduce the frictional contact of gases with hot solids, results in greatly improved yields of acetylene, amounting to over 100%, in some cases, of that obtainable with a stationary contact bed. Obviously, a countercurrently flowing bed of contact material would be even more disadvantageous than a stationary bed, other factors being equal.

While the above description has been limited to the production of acetylene, the process may be easily modified to obtain other unsaturated hydrocarbons, such for example as butadiene, ethylene, acetylene homologs, etc. from the same type of feed gases. For these products it is preferable to employ temperatures within the range of about 1200–1400° F. and contact times of about 1–3 seconds or more.

The foregoing disclosure of this invention is not to be considered as limiting since many variations may be made by those skilled in the art without departing from the scope or spirit of the following claims.

I claim:

1. A continuous process for the manufacture of acetylene which comprises preheating a stream of gaseous hydrocarbon to between about 700° F. and 1400° F., admixing therewith an inert particle-form heat-transfer material of between about 10 and 40 mesh preheated to above about 2000° F. thereby forming a solids-gas fluid suspension containing not more than about 10 pounds of solids per s. c. f. of gas, passing said fluid suspension downwardly from horizontal through a non-externally heated reaction zone at a velocity between about 25 and 400 feet per second, thereby maintaining the relative linear velocity of said solids and said gas at less than about 20 feet per second until said gaseous hydrocarbon has been heated to between 1800–3000° F. for between about 0.005–0.1 second, separating reaction gases from said heat-transfer material, then rapidly quenching said reaction gases to below about 1400° F. recovering acetylene from said reaction gases, reheating said heat-transfer material to above about 2000° F., and recycling said reheated heat-transfer material with a fresh charge of said preheated gaseous hydrocarbon.

2. A process according to claim 1 wherein said gaseous hydrocarbon comprises a lower aliphatic hydrocarbon.

3. A process according to claim 1 wherein said heat transfer material is essentially coke particles.

4. A process according to claim 1 wherein the flow of said fluid suspension in said reaction zone is substantially vertically downward.

5. A process for the manufacture of acetylene which comprises preheating a gaseous hydrocarbon feed to between about 700° F. and 1400° F., passing a stream of said preheated feed gas into the upper portion of a downflow tubular reactor, admitting inert solid particle-form heat-transfer material of between about 10 and 40 mesh preheated to above 2000° F. into said feed gas stream by a means responsive to the flow rate of said feed gas thereby forming a downflowing solids-gas fluid suspension containing not more than about 10 pounds of solids per standard cubic foot of feed gas wherein the average relative linear velocity of said solids and said gas is less than about 20 feet per second, allowing said fluid suspension to flow downwardly until said feed gas has been heated to between about 1800° F. and 3000° F. for a period of time between about 0.005 second and 0.1 second, separating reaction gases from said heat-transfer materials in a separation zone, rapidly cooling said gaseous products to below about 1400° F., passing solids from said separation zone downwardly into an induction zone, passing hot flue gases into said induction zone and upwardly therefrom into a communicating gas lift line, entraining said solids into said flue gas stream thereby simultaneously reheating and lifting said solids to an upper separation zone, removing spent flue gases from said upper separation zone, flowing separated reheated solids from said upper separation zone into a reservoir, and remixing said solids in said reservoir with fresh feed gas.

6. A process according to claim 5 wherein said heat transfer material is essentially coke particles.

7. In a process for the manufacture of acetylene by the pyrolysis of hydrocarbons wherein a gaseous hydrocarbon is heated at a high temperature for a short period of time by contact with inert, preheated, granular solids, the improvement which comprises employing therein granular heating solids of between about 10 and 40 mesh particle size, dispersing said solids into a stream of said gaseous hydrocarbon at a rate corresponding to not more than about 10 pounds of solids per s. c. f. of gaseous hydrocarbon, and immediately thereafter flowing the resulting gas-solids suspension downwardly from horizontal through a confined reaction zone, continuing said downward flow for a period of time sufficient to maintain said gaseous hydrocarbons at a temperature between 1800° and 3000° F. for a reaction period between about 0.001 and 0.5 second, and maintaining the average relative linear velocity of said solids and said gaseous hydrocarbon at less than about 20 feet per second throughout said reaction period, and immediately thereafter cooling the resulting gases to below about 1400° F. and recovering acetylene therefrom.

8. A process as defined in claim 7 wherein said downward flow is substantially vertically downward.

9. A process as defined in claim 7 wherein gaseous product is separated from said solids immediately after said reaction period, and the separated gases are then cooled to below about 1400° F.

10. In a process for the manufacture of low molecular weight unsaturated hydrocarbons by the pyrolysis of hydrocarbons wherein hot, inert, granular solids are contacted with a gaseous hydrocarbon thereby heating said gaseous hydrocarbon to a temperature between 1200° F. and 3000° F. for a reaction period of between 0.001 and 3.0 seconds, the improvement which comprises limiting the particle size of said granular solids to between about 10 and 40 mesh, and flowing said solids concurrently as a fluid suspension in said gaseous hydrocarbon downwardly from horizontal through a confined reaction zone, said fluid suspension containing not more than about 10 pounds of said solids per s. c. f. of said gaseous hydrocarbon, and maintaining the average relative linear velocity of said solids and said gaseous hydrocarbon at less than about 20 feet per second through said reaction zone.

References Cited in the file of this patent

UNITED STATES PATENTS

| | | |
|---|---|---|
| 2,405,395 | Bahlke et al. | Aug. 6, 1946 |
| 2,420,558 | Munday | May 13, 1947 |
| 2,422,501 | Roetheli | June 17, 1947 |
| 2,443,714 | Arveson | June 22, 1948 |
| 2,471,104 | Gohr | May 24, 1949 |
| 2,548,286 | Bergstrom | Apr. 10, 1951 |
| 2,585,984 | Alexander et al. | Feb. 19, 1952 |